United States Patent [19]
Seto

[11] Patent Number: 4,540,250
[45] Date of Patent: Sep. 10, 1985

[54] IMAGE DETECTING DEVICE

[75] Inventor: Susumu Seto, Odawara, Japan

[73] Assignee: Canon Kabushiki Kaisha, Tokyo, Japan

[21] Appl. No.: 614,843

[22] Filed: May 29, 1984

Related U.S. Application Data

[63] Continuation of Ser. No. 275,405, Jun. 18, 1981, abandoned.

[30] Foreign Application Priority Data

Jul. 1, 1980 [JP] Japan ................................. 55-89639

[51] Int. Cl.³ .......................... C03C 3/24; G02B 27/00
[52] U.S. Cl. ..................................... 350/438; 350/439
[58] Field of Search ............... 350/438, 446, 470, 439, 350/440

[56] References Cited
U.S. PATENT DOCUMENTS

| | | | |
|---|---|---|---|
| 2,685,230 | 8/1954 | Baker | 350/438 |
| 3,035,488 | 5/1962 | Alden | 350/439 |
| 3,368,078 | 2/1968 | Flint et al. | 350/409 |
| 3,481,758 | 12/1969 | Upton | 350/438 |
| 4,132,477 | 1/1979 | Watabe et al. | 355/11 |

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

An image detecting device includes a lens system for imaging a given surface area of an object on the light-receiving surface of a photoreceptor such as a photosensitive drum, a solid state pickup element or the like, said lens system including at least one single lens for absorbing light in a wavelength range having high sensitivity from an optical system containing said photoreceptor, said lens system being adapted to compensate said optical system in color sensitivity.

18 Claims, 7 Drawing Figures

IMAGE DETECTING DEVICE

This is a continuation of application Ser. No. 275,405, filed June 18, 1981, now abandoned.

BACKGROUND OF THE INVENTION

1. Field of the Invention

This invention relates to an image detecting device and, more particularly, an imaging lens system in such a device, having a wavelength selectivity for compensating an optical system containing a photoreceptor in color sensitivity.

2. Description of the Prior Art

In the prior art image detecting devices such as copying machines or the like, including a photosensitive drum of CdS type and a halogen lamp as a light source for illuminating originals, it has been found that red-colored letters and figures on the originals are faintly or not completely copied under the combined influences of the spectral sensitivity in the photoreceptor and the spectral wavelength characteristics in the light source. This is due to the fact that the halogen lamp is usually used at a filament temperature in the range of about 3000° K. with the radiation energy having its peak in the infrared range of 800 to 900 mμ and being uniformly decreased toward shorter wavelength range while at the same time the CdS photoreceptor has its spectral sensitivity increased in the range of between infrared and near infrared, so that the red-colored letters and figures will be subjected to excessive exposure in comparison with that of blue- and green-colored letters and figures.

On the contrary, it is difficult to effect good copying of blue-colored letters and figures in a photoreceptor of selenium type.

It is desirable to compensate the color sensitivity in such optical systems containing photoreceptors, light sources, mirrors or the like upon copying. To this end, the prior art has proposed a color filter in the form of a flat plate and a laminated interference film as described in U.S. Pat. No. 4,132,477. Both the proposals are utilized to avoid any excessive exposure by attenuating light in a selected wavelength range, for example, in the near infrared range for the combined system of the CdS type photoreceptor and halogen lamp.

Where the color filter in the form of a flat plate is used, however, there is an aberration in parallel planes and also a loss of light quantity in the effective wavelength range other than the near infrared range due to the characteristics of the filter. Particularly, where a lens of in-mirror type is used with such color filter, a loss of light quantity is increased since the light is passed through the filter two times. Furthermore, the added filter leads to an increased cost.

The laminated interference film also leads to an increased cost since it requires a deposition step. Moreover, the laminated interference film has another disadvantage in that the spectral characteristics thereof is varied depending on various factors, particularly, incident angle in that optical system.

It is further known that a heat absorbing filter for shutting off the near infrared light is used, for example, as a condenser lens for slide projectors. This filter is utilized to prevent the increasing of temperature, but not to provide any wavelength selectivity in a broad wavelength range corresponding to the spectral sensitivity of a photoreceptor as in this invention. Furthermore, the heat absorbing filter will not be used as an imaging lens having a pre-selected optical properties.

SUMMARY OF THE INVENTION

It is an object of this invention to provide an image detecting device which comprises an imaging lens itself having a wavelength selectivity for compensating a color sensitivity in an optical system containing a photoreceptor.

This object is accomplished by making the imaging lens from an optical glass material selected from crown glass materials of Lak or the like, flint glass materials of LF, BaSF or the like, and others, the optical glass material containing a light absorbing material incorporated thereinto for absorbing light in a wavelength range having high sensitivity in the optical system including the photoreceptor.

By using such an imaging lens having the wavelength selectivity, the color sensitivity can be compensated more inexpensively and properly in comparison with the prior art laminated interference film coating.

DESCRIPTION OF THE PREFERRED EMBODIMENTS

Figure 1:
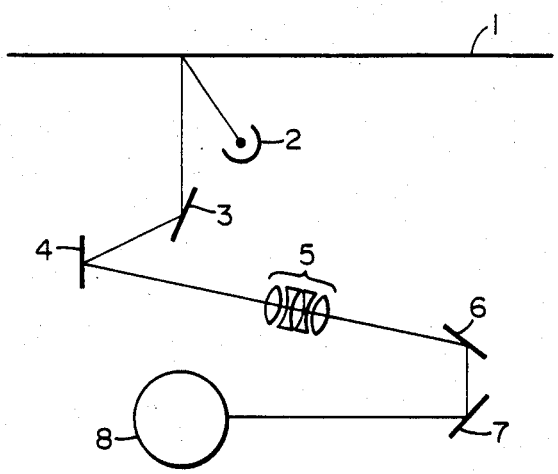
FIG. 1 is a schematic view of a copying machine to which this invention is applied.

Referring to FIG. 1, an original 1 is illuminated by means of a source of light 2 so as to be subjected to a slit-like exposure. The light reflected from the original is incident upon a fixed lens system 5 through scanning mirrors 3 and 4 which are moved in a direction parallel to the original 1 at a speed ratio of 2:1. The incident light is then projected in the form of a slit onto a photosensitive drum 8 through the fixed lens system 5 via stationary mirrors 6 and 7.

Figure 2:
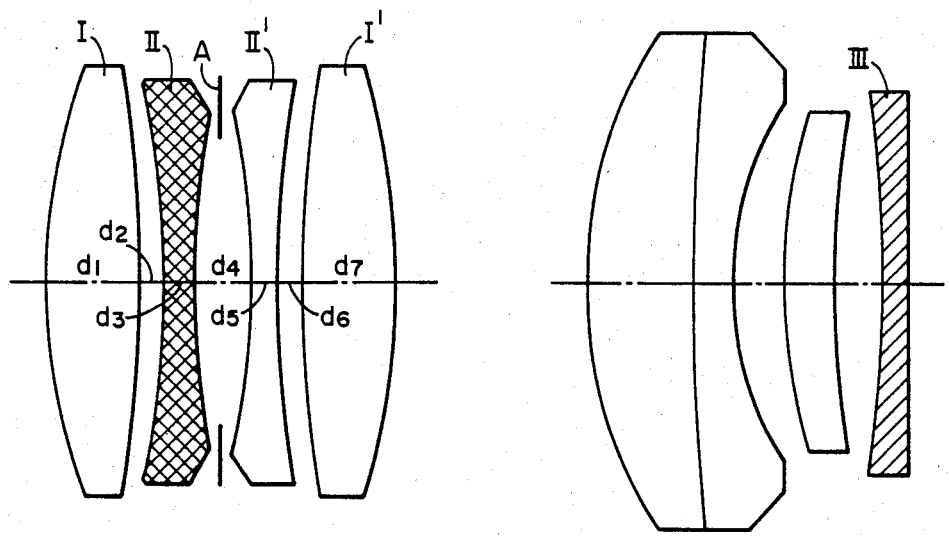
FIGS. 2 to 4 illustrate the first, second and third embodiments of this invention, respectively.

FIG. 2 shows a first embodiment of this invention which is in the form of a transmission type lens system comprising double-convex positive lenses I, I' and double-concave negative lenses II, II' which are disposed symmetrically relative to a diaphragm A. The positive lenses I and I' are made of an optical glass material of crown type having less dispersion while the negative lenses II and II' are made of an optical glass material of flint type having more dispersion. These combined lenses provide a lens system for copying machines which can restrain chromatic aberration and compensate for other aberrations.

The negative lens II is made of an optical glass material of a flint type having a shot symbol $LF_3$ which consists of 52.5% of $SiO_2$, 34.8% of PbO and the remainder of $Na_2O$, $K_2O$ and others. A trace of light absorbing material is incorporated uniformly into such an optical glass for absorbing light in the near infrared range substantially without any change in the optical constant obtained by the above composition.

Figure 5:
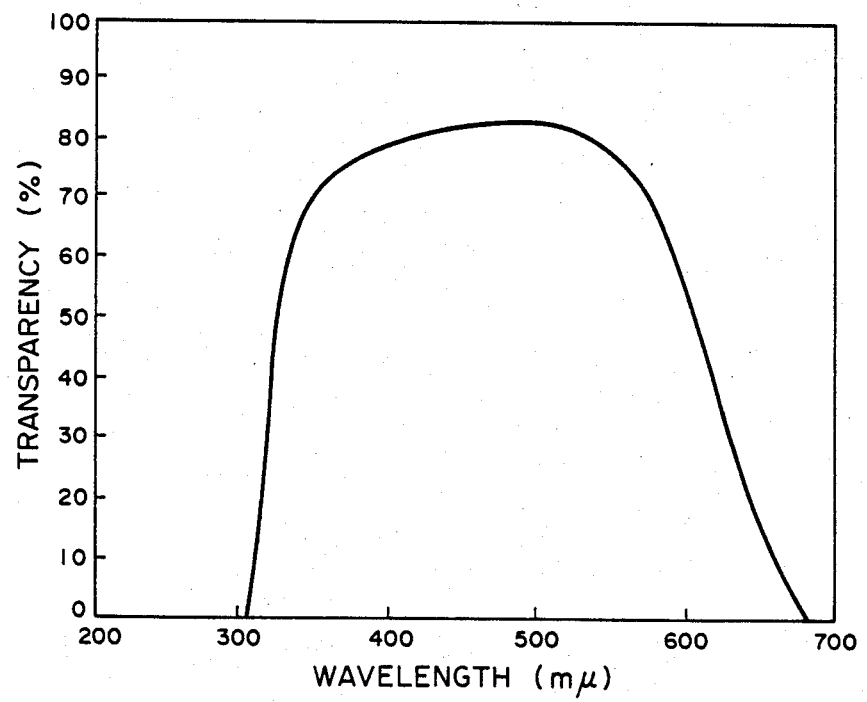
FIG. 5 is a graph illustrating the spectral transmission factor in an embodiment of this invention.

As a light beam is transmitted through the negative lens II, the light portion in the near infrared range is sharpcut by means of the light absorbing material. After passing through the negative lens II, the beam will have a spectral transmission factor compensating a spectral sensitivity in a photoreceptor as shown in FIG. 5. In such a manner, the photoreceptor 8 and thus the light source 2 can be compensated for in color sensitivity to obtain copied images havng a uniform density over the overall wavelength range.

The light absorbing materials include iron, cobalt aluminate, tungsten oxide, molybdenum, niobium, rhenium and others. One of such light absorbing materials is molten together with the above optical glass material to obtain a lens as a final product in which the light absorbing material is uniformly incorporated into the optical glass material. The so obtained lens is optically stable in refractive index and dispersion since these factors can be controlled within a predetermined range due to a trace of the light absorbing material incorporated into the optical glass material.

Lens data in the first embodiment of this invention are represented in the following table in which various values are indicated in units of millimeters:

| Lens | Radius of Curvature (r) | Spacing (d) | Dispersion ($\nu_d$) | Refractive Index (n) |
|---|---|---|---|---|
| I | 90.77 | 17.1 | 60.1 | 1.64 |
|   | −183.21 | 5.9 |  | 1 |
| II | −112.23 | 7.8 | 45.8 | 1.54 |
|   | 117.46 | 3.9 |  | 1 |
|   | — | 3.9 |  | 1 |
| II' | −117.46 | 7.8 | 45.8 | 1.54 |
|   | 112.23 | 5.9 |  | 1 |
| I' | 183.21 | 17.1 | 60.1 | 1.64 |
|   | −90.77 |  |  |  |

Figure 3:
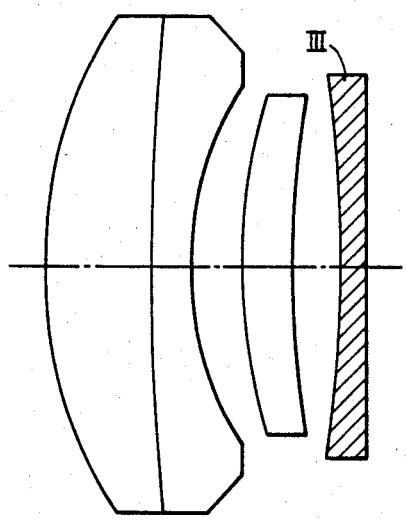

FIG. 3 shows a reflector type lens system which is a second embodiment of this invention. In this lens system, a mirror lens III includes a second face providing a mirror surface. An effective light beam passes through the mirror lens two times, so that the light in the near infrared range is attenuated. However, the light in the effective wavelength range other than the near infrared range can be effectively imaged without attenuation. In this case, the light beam will have a spectral transmission factor as shown in FIG. 5 wherein in the near infrared range the point of 50% selectivity occurs at substantially 600 mμ. In other words, the light absorbing material can be reduced by half in density in comparison with the embodiment shown in FIG. 2.

Figure 4:
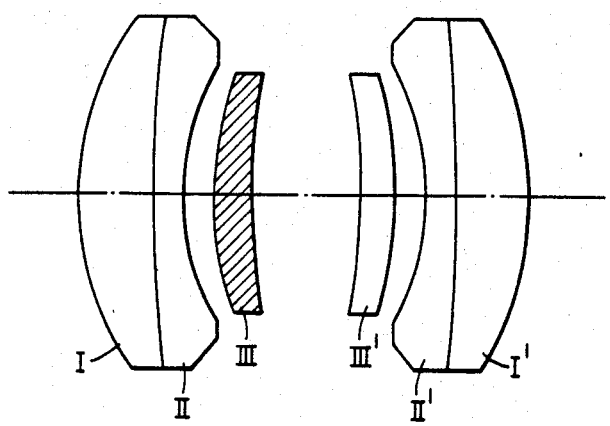

FIG. 4 shows a third embodiment of this invention in which the light absorbing material is uniformly incorporated into the material of a lens III. This lens III is a meniscus lens which is substantially constant in thickness. The lens III is made of an optical glass material of bibarium flint type represented by a shot symbol BaSF8, which has a composition of $SiO_2$—$B_2O_5$—PbO—BaO type. A trace of light absorbing material is uniformly incorporated into the optical glass material for absorbing the light in the near infrared range without any change of such optical constant as obtained by the above composition. Lens data in the third embodiment are represented in the following table in which various values are indicated by a unit of millimeter.

| Lens | r | d | $\nu_d$ | $n_d$ |
|---|---|---|---|---|
| I | 25.11 | 7.40 | 50.9 | 1.65 |
| II | −395.69 | 1.69 | 38.0 | 1.60 |
|   | 19.19 | 1.62 | — | 1.0 |
| III | 31.64 | 3.70 | 38.0 | 1.72 |
|   | 46.57 | 9.34 | — | 1.0 |
|   | −46.57 | 3.70 | 38.0 | 1.72 |
| III' | −31.64 | 1.62 | — | 1.0 |
|   | −19.19 | 1.69 | 38.0 | 1.60 |
| II' | 395.69 | 7.40 | 50.9 | 1.65 |
| I' | −25.11 |  |  |  |

In the lens system according to this invention, it is desirable in view of the balance in the light quantity loss due to the light absorption that the effective light beam passing through the lens system has substantially the same optical path lengths both on and out of the optical axis. For example, meniscus lenses as in the third embodiment are adaptable to such a requirement. However, lenses other than the meniscus lens can be also used for this purpose if they are substantially constant in thickness. In a lens system in which the same optical path lengths on and out of the optical axis cannot be obtained by only a single lens, the on-axis and out-of-axis optical path lengths can be balanced with respect to the total optical path length by using a plurality of single lenses into which the light absorbing material is incorporated.

Figure 6:
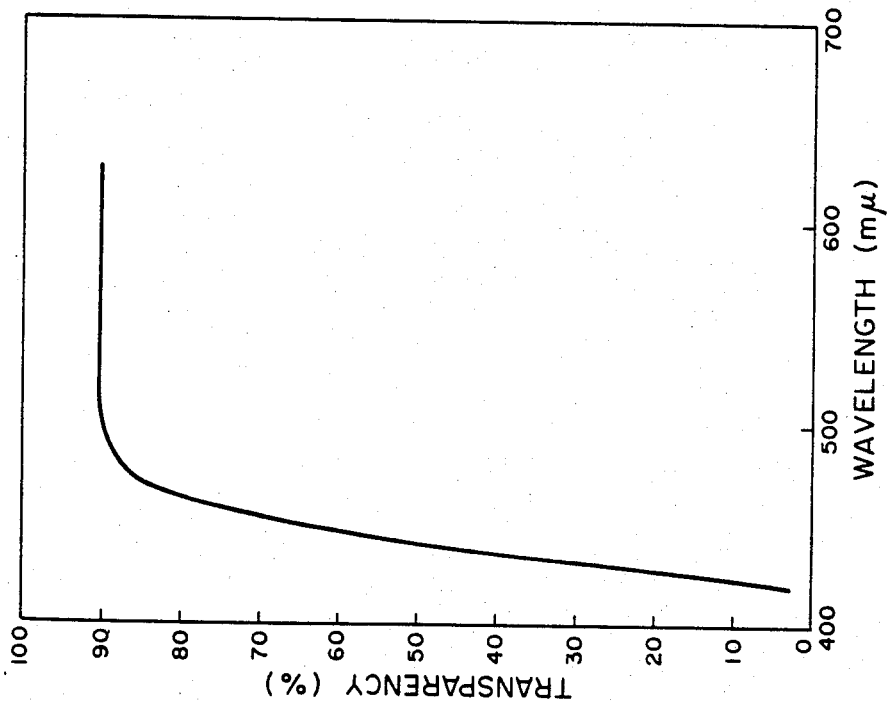

In accordance with this invention, photoreceptors other than the CdS type photoreceptor, for example, selenium type photoreceptor having high sensitivity in the short wavelength range can be also compensated in spectral sensitivity. A spectral transmission factor obtained in this case is shown in FIG. 6 wherein, for the near ultraviolet range, a transparency at 50% selectivity efficiency is seen to occur for wavelengths of substantially 450 mμ (mμ=nm). For example, by incorporating a light absorbing material capable of absorbing light in the short wavelength range into a lanthanum glass material of $SiO_2$—$B_2O_3$—$La_2O_3$—PbO—$Al_2O_3$ type, a lens for absorbing light in a particular short wavelength range can be obtained without any change of the optical constant and also the basic design for the optical element as in the previously mentioned light absorption in the longer wavelength range.

Figure 7:
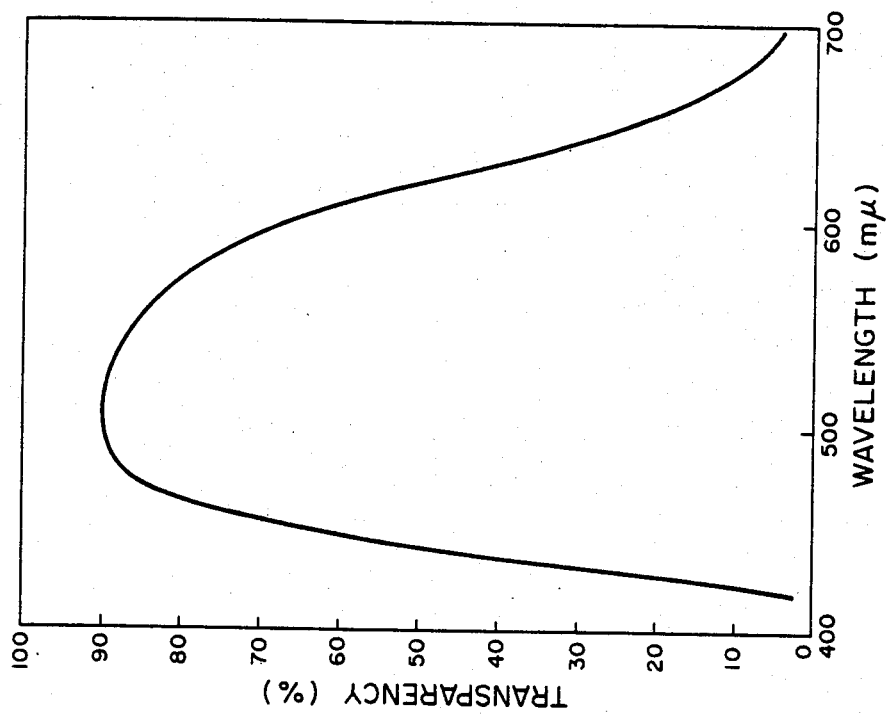
FIGS. 6 and 7 are graphs illustrating the spectral transmission factors in other embodiments of this invention.

For a photoreceptor having high sensitivities both in the long and short wavelength ranges, both the light absorbing materials capable of absorbing light in the long and short wavelength ranges are incorporated into an optical glass material. The spectral transmission factor for such a device is illustrated in FIG. 7, wherein the curve for shorter wavelengths is the same as is shown in FIG. 6. For longer wavelengths, however, the transparency at 50% selectivity efficiency occurs at substantially 600 nm.

Furthermore, this invention is also applicable to a photoreceptor consisting of organic photoconductive compounds.

It will be apparent from the foregoing that this invention provides an image detecting device comprising a lens system itself having a wavelength selectivity for compensating an optical system containing a photoreceptor in color sensitivity. This invention can be also applied to any lens system having a construction other than the above embodiments. Furthermore, this invention is applicable to all image detecting devices, other than the copying machines using the photosensitive drums, for example, facsimiles using solid state pickup elements as light-receiving elements, TV cameras including light-receiving elements with the desired spectral sensitivities and the like.

What I claim is:

1. An image detecting device comprising:
   an illuminating system having an illuminating light source for illuminating a preselected area of an object;
   a photoreceptor for receiving an image of said preselected area of an object; and
   an imaging lens system disposed in the path of the image to be received by the photoreceptor, said system including at least one imaging lens made of an optical glass havng a wavelength selectivity to certain visible light wavelengths to which said photoreceptor is sensitive, wherein such selectivity results from an absorption of a predetermined portion of visible light wavelengths by said one imaging lens to compensate for the wavelength sensitivity of said photoreceptor and the spectral wavelength characteristics of said illuminating system, wherein said selectivity provides a detected image on the photoreceptor having a uniform density over the overall wavelength range.

2. An image detecting device as defined in claim 1 wherein a light-absorbing material having a wavelength selectivity is incorporated into said one imaging lens in said imaging lens system.

3. An image detecting device as defined in claim 2 wherein said photoreceptor is of CdS type and wherein said light-absorbing material absorbs light in the near infrared range.

4. An image detecting device as defined in claim 2 wherein said single lens containing said light-absorbing material is a lens which is substantially constant in thickness.

5. An image detecting device as defined in claim 4 wherein said single lens having said light-absorbing material is a meniscus lens.

6. An image detecting device as defined in claim 1, wherein the wavelength selectivity is sharp-cut.

7. An optical system for a copying apparatus as defined in claim 6, wherein said imaging lens system compensates for the color sensitivity of said photoreceptor.

8. An image detecting device as defined in claim 6, wherein the wavelength at 50% in selectivity efficiency is substantially 600 nm.

9. An image detecting device as defined in claim 6, wherein the wavelength at 50% in selectivity efficiency is substantially 450 nm.

10. An image detecting device as defined in claim 1, wherein said illuminating light source is a halogen lamp.

11. An image detecting device as defined in claim 10, wherein said imaging lens has a wavelength selectivity to absorb light in the near infrared range.

12. An image detecting device as defined in claim 11, wherein said photoreceptor has a high sensitivity in the near infrared range.

13. An image detecting device as defined in claim 1, wherein said imaging lens system is designed to balance the light quantity loss due to the light absorption, wherein the effective light beam passing through said imaging lens has substantially the same optical path length both along and outside of the optical axis.

14. An image detecting device as defined in claim 1, wherein said imaging lens system has a plurality of single lenses into which the light absorbing material is incorporated, said single lens being designed to balance the light quantity loss due to the light absorption, wherein the effective light beam passing through said single lenses has substantially the same optical path length both along and outside of the optical axis with respect to the total optical path length.

15. An optical system for a copying apparatus comprising:
    an illuminating system having an illuminating light source for illuminating a preselected area of a color original, a photoreceptor onto which said preselected area of the color original is imaged, and an imaging lens system disposed in the path of the image to be received by the photoreceptor, said system including at least one single lens made of optical glass, wherein said one lens absorbs a predetermined portion of light having visual wavelengths thereby defining a wavelength region to compensate for color sensitivity of said optical system including said photoreceptor and said illuminating system, and wherein said selectivity provides a detected image on the photoreceptor having a uniform density over the overall wavelength range.

16. An optical system for a copying apparatus as defined in claim 15, wherein the wavelength selectivity is sharp-cut.

17. An image detecting device as defined in claim 6, wherein the wavelength selectivity at 50% selectivity efficiency occurs in the range of near infrared.

18. An image detecting device as defined in claim 6, wherein the wavelength selectivity at 50% selectivity efficiency occurs in the range of near ultraviolet.

* * * * *